Jan. 16, 1951    W. W. STROUP ET AL    2,538,171
TROLLING AND CASTING PLUG
Filed Aug. 5, 1948
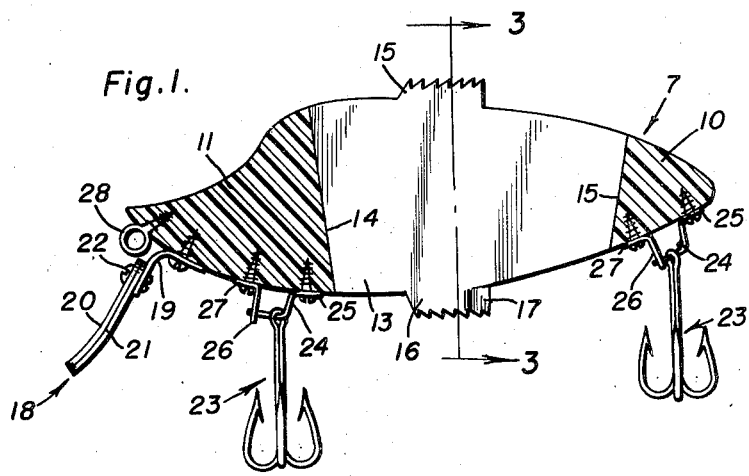
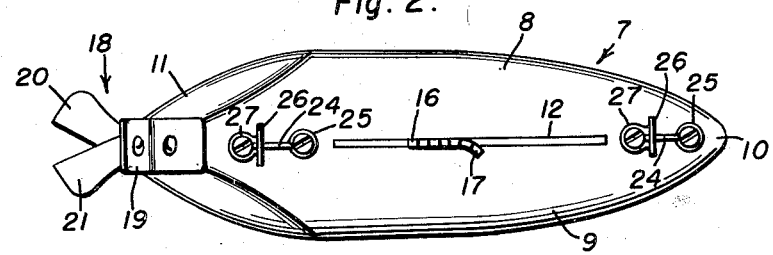
 
Walter W. Stroup
John J. Faber
INVENTORS Patented Jan. 16, 1951

2,538,171

UNITED STATES PATENT OFFICE 2,538,171

TROLLING AND CASTING PLUG

Walter W. Stroup, Union, and John J. Faber, Endicott, N. Y.

Application August 5, 1948, Serial No. 42,708

3 Claims. (Cl. 43—42.09)

1

The present invention relates to a novel and improved angler's fishing plug which is adapted for trolling but is equally well and satisfactorily usable for casting, said plug being unique in that it is original and, therefore, distinct in appearance, compared to similar plugs, and embodies appreciably novel refinements and improvements.

A significant object of the invention is to provide a transparent plastic or equivalent plug which may be, if desired, colorfully tinted to embody one element of attraction, said body, in addition, being fashioned with holding means for interchangeable inserts, said inserts also being of colored plastic and the colors of each varying to permit the angler to experiment and employ an insert of the desired color, depending on results wanted and to thus add to the utility and resultfulness of the plug.

More specifically, novelty is predicated upon a centrally and longitudinally slotted transparent plastic or equivalent plug of carefully contoured external shape and appearance, the slot thereof opening through dorsal and ventral surfaces of the body and serving as an accommodation and retaining pocket for the stated inserts, the inserts being readily applicable and removable to obtain the aforementioned changeable results, particularly in respect to alluring color schemes.

A further object of the invention is to provide deflector means on the nose of the plug, said means being adjustable and properly angled to facilitate submerging the plug.

In addition to the above, it is an object of the invention to provide special but simple devices on the forward and rear underneath portions of the plug for convenient attachment of multiple prong fishing hooks.

Other objects and advantages will become more readily apparent from the following description and the accompanying illustrative drawings.

In the drawings:

Figure 1 is a view in section and elevation of a fishing plug constructed in accordance with the invention;

Figure 2 is a bottom plan view of same;

Figure 3 is a cross section on the line 3—3 of Figure 1, looking in the direction of the arrows;

Figure 4 is a perspective view of one of the inserts;

Figure 5 is a perspective view of the submerging or so-called diving bill carried by the forward end of the plug.

Referring now to the drawings by reference numerals and corresponding lead lines, it will be seen that the body of the plug, in a general and unitary sense, is denoted by the numeral 7, the same being, in many respects, similar to competitive fishing plugs used for trolling and casting. The major portion of the body is hollow and, in fact, is essentially made up of semicircular hollow cells 8 and 9 (see Figure 3) which are air-tight and provide floats, rendering the plug satisfactorily buoyant. The tail portion is solid but transparent plastic as at 10 and the nose or head portion 11 is also solid. The central region of the body, between the air cells, provides an adapter and holder slot 12 which, as stated, opens through the dorsal and ventral portions and is designed to accommodate readily applicable and removable plastic or equivalent inserts 13. Each insert is in the form of a flat plate of the size and shape shown in particularity in Figure 4 of the drawings. The transverse end portions of the slot are inclined in respect to the longitudinal axis of the body and provide abutments for the correspondingly inclined or angled transverse ends 14 and 15 of the insert. The ends 14 and 15 being thus arranged in converging relation provide the desired wedging relationship of parts, thus facilitating the step of lodging the insert in the slot means and preventing it from being pushed downwardly through and beyond the ventral edges of the slot. Each insert has a serrated fin 15 at the top which fairly represents the fin of a fish, but is also important in that it provides a finger-grip to apply and remove the insert. There is a similar fin, also serrated or toothed, at the bottom and this is denoted at 16 and has one end portion deflected as at 17 to provide a detent. This detent is sufficiently resilient that it may be snapped to one side and lined up with the slot to permit the insert to be removed. When the insert is slipped in the slot, the detent lines up with the slot and then when the detent reaches the underside of the body it snaps to one side and provides the desired latching or locking effect. As stated, the slotted body forming the plug proper is transparent and preferably not colored but in certain instances it may be desired to tint the plastic material with coloring material of light shades. The inserts are of vivid colors, the shades depending on the discretion of the user. All of the inserts (only one shown) are standardized and are interchangeable and, therefore, it is possible to purchase a single slotted plastic plug and to buy a number of inserts to be used in connection therewith according to choice.

The aforementioned diving bill is a simple adjustable attachment for the forward or nose portion of the plug and it is denoted, as a unitary device, by the numeral 18. It comprises an L-shaped or corresponding attaching bracket 19 which is appropriately fastened to the underside of the nose of the plug as shown in Figures 1 and 2. The depending flange of the bracket carries a pair of duplicate blades 20 and 21 of appropriate dimensions and shape. These are fastened by a common bolt and nut assembly 22 to the attaching bracket. By thus loosening the bolt it is possible to move the blades toward and from each other to obtain the desired angular relationship. That is to say the "bill" may be made wide or narrow according to the discretion of the plug user.

The multiple prong fishing hooks, which are conventional, are denoted by the numeral 23 and these are attached by special fixtures to the belly or underside of the plug. More specifically, each attaching fixture comprises a substantially L-shaped member 24 having an eye 25 at one end which is fastened by a screw or the like, the free end of the L-member being slightly flexible and releasably connectible with an aperture in a keeper plate or clip 26 having an eye 27 also screwed or otherwise fastened to the plug body. These members 24 and 26 constitute effective elements in detachably mounting the eye-equipped end of a fishing hook on the plug.

The numeral 28 designates an eye screw attached to the forward end of the plug and adapted to accommodate the fishing line (not shown).

It may be added that the insert 13 may, in practice, be made of materials of different weights such, as for example, wood, plastic, aluminum, steel, lead, etc., whereby to vary the weight of the plug, depending on the depth needed for varying fishing requirements.

It is though that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. An artificial bait comprising a plug for trolling and casting, said plug embodying an elongated transparent lure-type body having a central vertical adapter slot, the upper end of said slot opening through the dorsal portion of the body and the lower end of the slot opening through the ventral portion of said body, and a colored insert adapted to fit removably and snugly in said slot, the transverse end portions of said slot being in downwardly convergent relationship and the transverse ends of the insert being correspondingly angled so that the insert is thus adapted to be removably wedged and frictionally lodged in the slot.

2. The structure as specified in claim 1, said insert being a substantially flat plate virtually filling said slot and provided on top and bottom edges with outstanding serrated fins.

3. The structure as specified in claim 1, said insert being a substantially flat plate virtually filling said slot and provided on top and bottom edges with outstanding serrated fins, one fin having a deflected end portion constituting a resilient detent.

WALTER W. STROUP.
JOHN J. FABER.

REFERENCES CITED

The following references are of record in the file of this patent:

UNITED STATES PATENTS

| Number | Name | Date |
|---|---|---|
| 865,683 | Credlebaugh | Sept. 10, 1907 |
| 1,007,007 | Pflueger | Oct. 24, 1911 |
| 1,220,921 | Wilson | Mar. 27, 1917 |
| 1,494,605 | Jones | May 20, 1924 |
| 1,542,404 | Paulson | June 16, 1925 |
| 1,606,176 | Paulson | Nov. 9, 1926 |
| 1,920,935 | Khoenle | Aug. 1, 1933 |
| 2,006,604 | Post | July 2, 1935 |
| 2,123,951 | McArthur | July 19, 1938 |
| 2,309,521 | Mabee | Jan. 26, 1943 |